March 10, 1953 — W. F. POORE — 2,630,786
MULTIPLE POSITION FLUID PRESSURE MOTOR
Filed June 14, 1951 — 2 SHEETS—SHEET 2

ROTARY VALVE HANDLE POSITIONS

INVENTOR.
WALLACE F. POORE
BY
Frank E. Miller
ATTORNEY

Patented Mar. 10, 1953

2,630,786

UNITED STATES PATENT OFFICE 2,630,786

MULTIPLE POSITION FLUID PRESSURE MOTOR

Wallace F. Poore, Wilmerding, Pa., assignor to Westinghouse Air Brake Company, a corporation of Pennsylvania Application June 14, 1951, Serial No. 231,557

3 Claims. (Cl. 121—38)

1

This invention relates to fluid motors and more particularly to the type for operating a device to any one of a plurality of fixed positions.

One object of the invention is to provide an improved fluid motor of the above type.

Another object of the invention is the provision of a fluid motor operable to effect movement of a device connected thereto successively from one to another of a plurality of definite positions which may be equally or differently spaced apart, as desired.

Another object of the invention is the provision of a fluid motor operable to effect movement of a device connected thereto from any one of a plurality of positions to any other of the plurality of positions.

Other objects and advantages will be apparent from the following more detailed description of the invention.

Figure 1:
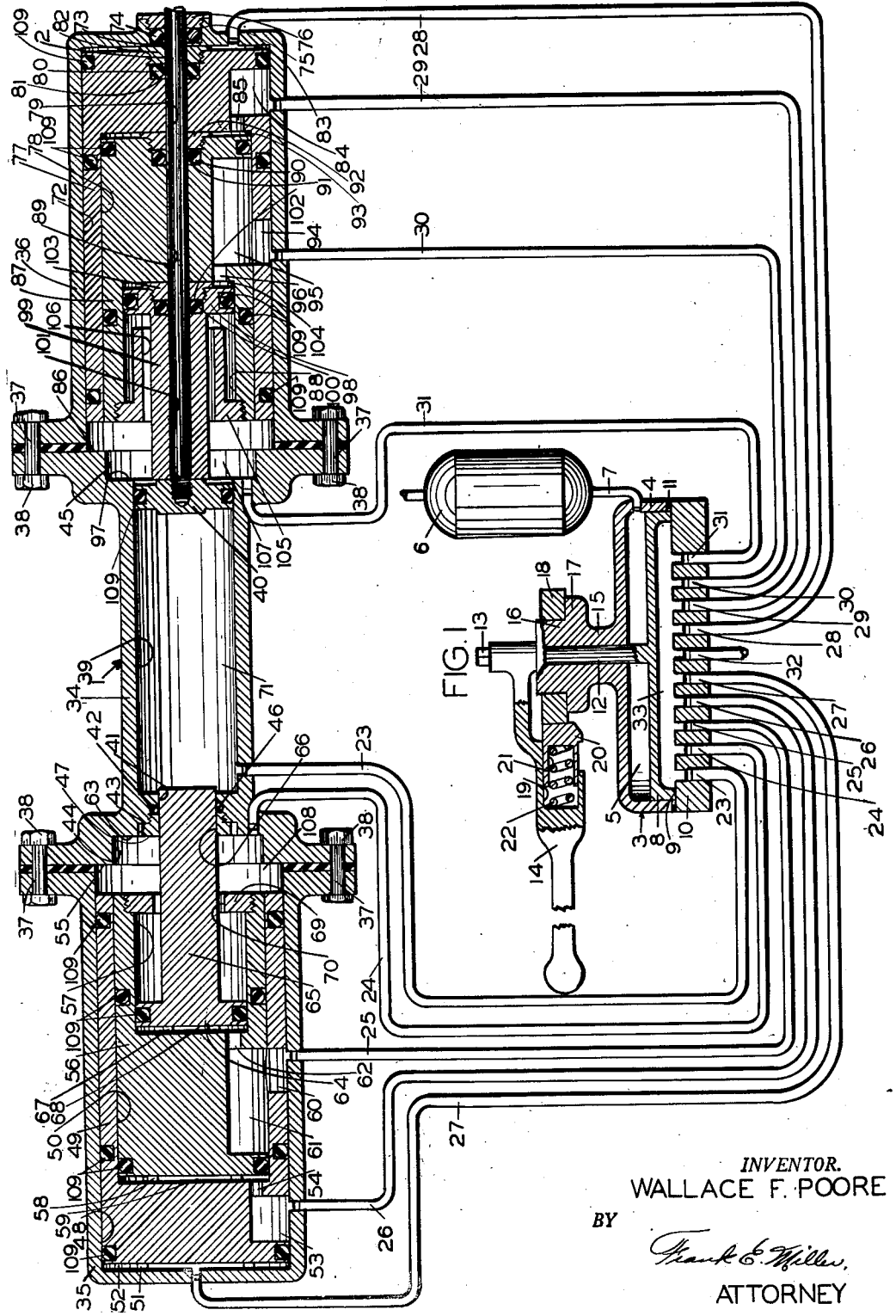
Figure 2:
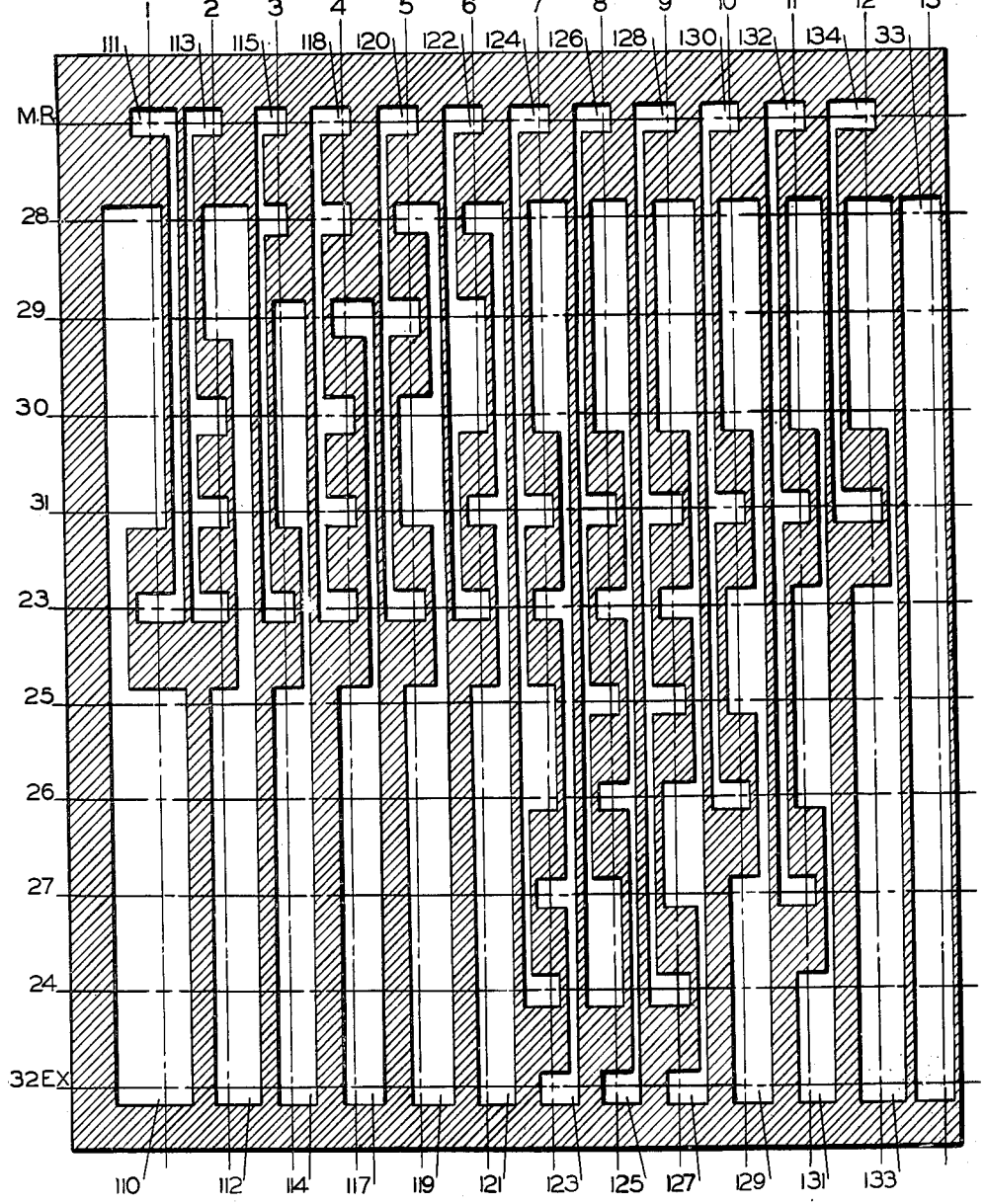

In the accompanying drawings; Fig. 1 is a diagrammatic view, mainly in section, of a fluid pressure control system embodying, in vertical section, a fluid motor constructed in accordance with one embodiment of the invention; and Fig. 2 is a diagrammatic view, in development form of an operator's motor control valve device shown in cross-section in Fig. 1.

Description

As shown in Fig. 1 of the drawing, the reference numeral 1 designates a fluid motor, embodying the invention, for operating a device (not shown) which may be connected to a piston rod 2 of said motor. A manually operative control valve device 3 is arranged for controlling supply of fluid under pressure to and release of fluid under pressure from the fluid motor 1 for controlling operation thereof.

The control valve device 3 comprises a sectionalized casing 4 having a chamber 5 which is connected to and adapted to be charged through a pipe and passage 7 with fluid under pressure from a reservoir 6, charged with fluid under pressure by a fluid compressor (not shown). Contained in the chamber 5 is a rotary valve 8 cooperating with a valve seat 9 on a pipe bracket casing section 10 separated from the casing section 4 by a gasket 11 of some suitable resilient material such as rubber, the two casing sections being secured together by any suitable means (not shown). The rotary valve 8 is adapted to be operated by a rotary stem 12 which extends to the exterior of the casing 4 and has a squared outer end portion 13 at the end thereof for receiving a handle 14.

2

The casing 4 is provided with an upstanding portion 15 having a spindle 16 and a flange 17 through which the stem 12 projects. A cam 18 is press-fitted on the spindle 16 and rests against the flange 17. The periphery of cam 18 is provided with a plurality of indents (not shown) corresponding to a plurality of positions of the handle 14. Slidably mounted in a counterbore 19 in the handle 14 is a plunger 20. The plunger 20 is provided with a counterbore 21 and is yieldingly urged into contact with the cam 18 by a spring 22 interposed between the left-hand end of counterbore 19 and the right-hand end of counterbore 21. Movement of the handle 14 from one position to another is resisted by the spring 22 as the right-hand end of the plunger 20 moves from one indent to another along the periphery of the cam 18 thereby giving an operator a sense of "feeling" when the handle reaches the desired position.

As indicated in Fig. 2 the rotary valve 8 may be positioned in any one of thirteen positions, one of which is shown in Fig. 1 and indicated in Fig. 2 as position No. 13.

Opening at the valve seat 9 are a plurality of ports and passages 23, 24, 25, 26, 27, 28, 29, 30, 31 and an atmospheric exhaust port 32. With the rotary valve 8 in position No. 13 all of these passages are open to port 32 via cavity 33 in the rotary valve and therefore vented. Each of these passages is connected by a pipe bearing the same numeral to the fluid motor 1.

The fluid motor 1 comprises a center casing section 34 and two oppositely arranged but like end casing sections 35 and 36 which are secured to opposite ends of the center casing section 34 by a plurality of bolts 37 and nuts 38. The casing section 34 has a bore 39 in which is slidably mounted a piston 40 connected to one end of the piston rod 2. A bore 41 smaller than bore 39 opens through an end wall of bore 39 to three counterbores 42, 43 and 44 of increasing diameters open to the left-hand end of casing section 34 while the opposite end of bore 39 is open to a counterbore 45 of larger diameter open to the right-hand end of casing section 34, all of said bores and counterbores being co-axially arranged one with the other. A gasket ring 46 is disposed in the counterbore 42 and is clamped between the casing section 34 and a plug 47 having screwthreaded engagement with said casing section.

The casing section 35 is provided with a counterbore 48 which is coaxial with the bore 41 and substantially larger in diameter than the counterbore 44. Slidably mounted in the counterbore 48 is a piston member 49 having a counterbore 50 and a plurality of stop lugs 51 formed on the end of said piston member opposite the open end of the counterbore 50. The lugs 51 are adapted to engage the casing section 35 at the left-hand end of counterbore 48 to form between the casing section 35 and piston member 49 a chamber 52 which is open to pipe 27. The piston member 49 is provided with an opening 53 which is connected to the counterbore 50 by a passageway 54. The pipe 26 is connected to the casing section 35 and opens into the opening 53 at a point a sufficient distance from the left-hand wall of said opening to permit movement of the piston member 49 in the direction of the right-hand until said member engages a stop surface 55 formed on the left-hand end of the center casing section 34 without the piston member 49 closing the opening of pipe 26 to the opening 53.

Slidably mounted in the counterbore 50 is a piston member 56 having a counterbore 57 and a plurality of stop lugs 58 formed on the end of said piston member opposite the open end of the counterbore 57. The lugs 58 are adapted to engage the piston member 49 at the left-hand end of the counterbore 50 to form between the piston members 49 and 56 a chamber 59 which is constantly open to pipe 26 via passageway 54 and opening 53. The piston member 49 is provided with a second opening 60. The pipe 25 is connected to the casing section 35 and opens into the opening 60 at a point a sufficient distance from the left-hand wall of said opening to permit movement of the piston member 49 in the direction of the right-hand until said member engages the stop surface 55 without closing the opening of pipe 25 into the opening 60.

The piston member 56 is provided with an opening 61 which is connected to the counterbore 57 by a passageway 62. The length of the cored opening 61 parallel to the horizontal axis of the piston member 56 is made sufficient to permit movement of said member in the direction of the right-hand until said member engages a stop surface 63 formed on the center casing section 34 at the right-hand end of the counterbore 44 without said member closing the communication from the opening 60 to the passageway 62. It may be noted that the diameter of the counterbore 44 is substantially the same as the outside diameter of the piston member 56. Thus the wall of the counterbore 44 may serve as a guide for the right-hand end of the piston member 56 upon said end entering said counterbore.

Slidably mounted in the counterbore 57 is a piston 64 having on its right-hand side a stem 65 formed integral therewith and of sufficient length to slidably extend through a bore 66 in plug 47, bore 41 and into counterbore 39, the peripheral surface of said stem being in sealing and sliding contact with the gasket ring 46. The piston 64 is provided on its left-hand side with a plurality of stop lugs 67 adapted to engage the piston member 56 at the left-hand end of the counterbore 57 to form between the piston 64 and the piston member 56 a chamber 68 in constant communication with pipe 25 via openings 60 and 61, and passageway 62.

The piston 64 is retained in the counterbore 57 by a retaining member 69 having screw-threaded engagement with the piston member 56 adjacent the right-hand end of said counterbore. The retaining member 69 is provided with a bore 70 through which projects the stem 65. The diameter of the bore 70 is substantially greater than the diameter of the stem 65 to permit flow of fluid under pressure to the right-hand face of the piston 64 from pipe 24 which is connected to the center casing section 34 and opens into the right-hand end of the counterbore 44.

The pipe 23 is connected to the casing section 34 and opens into the counterbore 39 adjacent its left-hand end and thereby to a chamber 71 formed between the left-hand end of counterbore 39 and the piston 40.

The casing section 36 is provided with a counterbore 72 and a through bore 73 each coaxial with the counterbore 39. Slidably mounted in the bore 73 is the piston rod 2, the peripheral surface of which is in sealing and sliding contact with a gasket ring 74, disposed in a counterbore 75 coaxial with the bore 73, and clamped between the casing section 36 and a plug 76 having screw-threaded engagement with said casing section.

Slidably mounted in the counterbore 72 is a piston member 77 having a counterbore 78 and a through bore 79. Slidably mounted in the bore 79 is the piston rod 2, the peripheral surface of which is in sealing and sliding contact with a gasket ring 80 disposed in a counterbore 81 coaxial with the bore 79 and clamped between the piston member 77 and a plug 82 having screw-threaded engagement with said piston member.

The head of plug 82 is adapted to engage the casing section 36 at the right-hand end of counterbore 72 to form between the casing section 36 and piston member 77 a chamber 83 which is open to pipe 28. The piston member 77 is provided with an opening 84 which is connected to the counterbore 78 by a passageway 85. The pipe 29 is connected to the casing section 36 and opens into the opening 84 at a point a sufficient distance from the right-hand wall of said opening to permit movement of the piston member 77 in the direction of the left-hand until said member engages a stop surface 86 formed on the right-hand end of center casing section 34 without the piston member 77 closing the opening of pipe 29 to the opening 84.

Slidably mounted in the counterbore 78 is a piston member 87 having a counterbore 88 and a through bore 89. Slidably mounted in the bore 89 is the piston rod 2, the peripheral surface of which is in sealing and sliding contact with a gasket ring 90 disposed in a counterbore 91 coaxial with the bore 89 and clamped between the piston member 87 and a plug 92 having screw-threaded engagement with said piston member.

The head of plug 92 is adapted to engage the piston member 77 at the right-hand end of counterbore 78 to form between the piston members 77 and 87 a chamber 93 in constant communication with pipe 29 via passageway 85 and opening 84.

The piston member 77 is provided with a second opening 94. The pipe 30 is connected to the casing section 36 and opens into the opening 94 at a point a sufficient distance from the right-hand wall of said opening to permit movement of the piston member 77 in the direction of the left-hand until said member engages the stop surface 86 without closing the opening of pipe 30 to the opening 94.

The piston member 87 is provided with an opening 95 which is connected to the counterbore 88 by a passageway 96. The length of the opening 95 parallel to the horizontal axis of the piston member 87 is made sufficient to permit movement of said member in the direction of the left-hand until said member engages a stop surface 97 formed on the center casing section 34 at the left-hand end of the counterbore 45 without said member closing the communication from the opening 94 to the passageway 96. It may be noted that the diameter of the counterbore 45 is substantially the same as the outside diameter of the piston member 87. The wall of the counterbore 45 may therefore serve as a guide for the left-hand end of the piston member 87 upon said end entering said counterbore.

Slidably mounted in the counterbore 88 is a piston 98 having on one side a stem 99 formed integral therewith. The piston 98 and stem 99 are provided with a counterbore 100 and a through bore 101. Slidably mounted in the bore 101 is the piston rod 2, the peripheral surface of which is in sealing and sliding contact with a gasket ring 102 disposed in the counterbore 100 and clamped between the piston 98 and a plug 103 having screw-threaded engagement with said piston.

The head of plug 103 is adapted to engage the piston member 87 at the right-hand end of counterbore 88 to form between the piston 98 and piston member 87 a chamber 104 in constant communication with pipe 30, via openings 94 and 95, and passageway 96.

The stem 99 extends from the piston 98 in the direction of the bore 39 and the length of the stem is such that its end terminates at the junction of the counterbores 39 and 45 with the pistons 98, 87 and 77 in the position in which they are shown in the drawing to serve as a stop for the piston 40 to limit the travel thereof in the direction of the right-hand.

The piston 98 is retained in the counterbore 88 by a retaining member 105 having screw-threaded engagement with the piston member 87 adjacent the left-hand end of said counterbore. The retaining member 105 is provided with a bore 106 through which projects the stem 99. The diameter of bore 106 is substantially greater than the diameter of the stem 99 to permit flow of fluid under pressure to the left-hand face of the piston 98 through a chamber 107 from the pipe 31 which is connected to the center casing section 34 and opens into the left-hand end of the counterbore 45.

In order to prevent leakage of fluid under pressure between the chambers 83, 93, 104, 107, 71, a chamber 108 formed between plug 47 and piston 64, chambers 68, 59 and 52, the respective piston members 77, 87, 49 and 56, and pistons 98, 40 and 64 are each provided with a resilient gasket ring 109 having sealing and sliding contact with the wall of the respective bore in which it operates.

*Operation*

In operation, let it be assumed that the storage reservoir 6 is charged with fluid to some chosen pressure, such as one hundred pounds per square inch; through pipe 7, the rotary valve chamber 5 in the control valve device 3, is likewise charged to the same pressure. Further assume that the handle 14 of the control valve device 3 occupies the position in which it is shown in Fig. 1, and indicated as No. 13 in Fig. 2, in which the cavity 33 in the rotary valve 8 connects the pipes 23, 24, 25, 26, 27, 28, 29, 30 and 31 to the exhaust port 32. In this position of rotary valve 8 fluid under pressure is therefore completely vented from the fluid motor 1, this position being used whenever the fluid motor is not in use, or for making any repairs to the motor.

To maintain the piston 40 and a device (not shown), which may be connected thereto through the piston rod 2 against a change from the position shown in Fig. 1, due to an external force acting on the piston rod 2 in the direction of the left-hand, the operator will turn the handle 14 of the control valve device 3 from position No. 13 to position No. 1.

As will be seen in Fig. 2, with the operating handle 14 of the control valve device 3 in position No. 1, a cavity 110 in the rotary valve 8 connects the pipes and passages 24, 25, 26, 27, 28, 29, 30 and 31 to the exhaust port 32 thus venting the motor chambers 108, 68, 59, 52, 83, 93, 104 and 107, respectively, while a port 111 in said rotary valve is effective to supply fluid at main reservoir pressure from the chamber 5 to the pipe 23 and thence to the chamber 71. As fluid under pressure is thus initially supplied to the chamber 71, it will flow against the left-hand face of piston 40 and the right-hand end of stem 65. The fluid under pressure thus acting on piston 40 and stem 65, with chamber 107 vented is effective to maintain the movable parts of the fluid motor in the position in which they are shown in Fig. 1 and the device (not shown) connected to the piston rod 2 against movement due to external forces.

To move the piston 40 and the device connected thereto by means of the piston rod 2, in the direction of the left-hand in a series of successive steps, corresponding to selected positions of the device being operated and without possibility of overtravel, the operator will first turn the handle 14 from position No. 1 to position No. 2.

As will be seen in Fig. 2, with the handle 14 in position No. 2, a cavity 112 in the rotary valve 8 connects the pipes and passages 24, 25, 26, 27, 28 and 29 to the exhaust port 32 thus venting the chambers 108, 68, 59, 52, 83 and 93, respectively, while a port 113 in said rotary valve is effective to supply fluid at main reservoir pressure from the chamber 5 to the pipes 30, 31 and 23 and thence to the right and left-hand faces of pistons 98 and 40.

Since the diameter of the stem 99 is greater than the diameter of the piston rod 2, the effective area of the left-hand face of the piston 98 is less than the effective area of the right-hand face of said piston. Since the area of piston 98 thus subjected to pressure of fluid in chamber 104 is greater than the area of the opposite face of piston 40, a differential in opposing forces is thereby established on said pistons which will move the two pistons toward the left-hand to a position defined by contact of piston 98 with retaining member 105. The area of the right-hand face of piston 40 being less than the area of the opposite face by the area of rod 2, a differential force is provided on said piston which urges same against the stem 99 to prevent overtravel of piston 40 when moved by piston 98, as just described, from position No. 1 to position No. 2.

It will be noted that it is not necessary to supply fluid under pressure to pipe 31 as above described when handle 14 is turned to position No. 2 from position No. 1, since fluid under pressure supplied to pipes 30 and 23 will establish the differential of pressures sufficient to move pistons 98 and 40 in the direction of the left-hand. It is necessary, however, as will be later described, to supply fluid under pressure to pipe 31 when handle 14 is turned from position No. 3 or some other position back to position No. 2, to move piston member 77 and 87 back to the position in which they are shown in Fig. 1, if they do not already occupy this position.

To continue the movement of piston 40 in the direction of the left-hand, the operator will turn the handle 14 from position No. 2 to position No. 3.

As will be seen in Fig. 2, with the handle 14 in position No. 3, a cavity 114 in the rotary valve 8 connects the pipes and passages 24, 25, 26, 27, 29, 30 and 31 to the exhaust port 32 thus venting the chambers 108, 68, 59, 52, 93, 104 and 107, respectively, while a port 115 in said rotary valve is effective to supply fluid at main reservoir pressure from the chamber 5 to the pipes 28 and 23 and thence to the right-hand face of piston member 77 and the left-hand face of piston 40.

A differential of forces will thereby be established by fluid under pressure in the chambers 83 and 71 acting on piston members 77 and 87 which will move said piston members in the direction of the left-hand until piston member 87 engages first the piston 98, the piston member 87 after engaging piston 98 moving said piston and piston 40 against pressure of fluid in chamber 71 acting on piston 40 until piston member 77 engages the stop surface 86.

With the pistons of the fluid motor 1 in the position shown in Fig. 1, the distance from the left-hand end of piston member 77 to the stop surface 86 is greater than the distance from the left-hand face of piston 98 to the retaining member 105. Therefore, when the piston member 77 engages the stop surface 86, the piston 40 will occupy a position to the left of the position it occupied when the handle 14 was in position No. 2.

To continue the movement of piston 40 in the direction of the left-hand, the operator will turn the handle 14 from position No. 3 to position No. 4.

As will be seen in Fig. 2, with the handle 14 in position No. 4, a cavity 117 in the rotary valve 8 will connect the pipes and passages 24, 25, 26, 27 and 29 to the exhaust port 32 thus venting the chambers 108, 68, 59, 52 and 93, respectively, while a port 118 in said rotary valve is effective to supply fluid at main reservoir pressure from the chamber 5 to pipes 23, 28, 30 and 31 and thence to the right and left hand faces of pistons 40 and 98 and piston member 77.

The fluid under pressure supplied to chamber 83 through pipe 28 is effective to maintain piston member 77 in engagement with the stop surface 86.

Since, as has been hereinbefore explained, the effective area of the left-hand face of the piston 98 is less than the effective area of the right-hand face of said piston, and the area of the right-hand face of said piston is greater than the area of the left-hand face of piston 40, the fluid under pressure supplied to the right-hand face of piston 98 and left-hand face of piston 40 establishes a differential in opposing forces on said pistons which will move the two pistons toward the left-hand to a new position defined by contact of piston 98 with retaining member 105. As has been hereinbefore explained, the area of the right-hand face of piston 40 being less than the area of the opposite face, a differential force is provided on said piston which urges same against the stem 99 to prevent overtravel of piston 40 when moved by piston 98, as just described.

It will be noted that it is not necessary to supply fluid under pressure to pipe 31 when handle 14 is turned to position No. 4 from position No. 3 since fluid under pressure supplied to pipes 30 and 23 will establish a differential of forces on pistons 98 and 40 sufficient to move said pistons in the direction of the left-hand. It is necessary, however, to supply fluid under pressure to pipe 31 when handle 14 is turned from position No. 5, or some other position back to position No. 4 to move piston member 87 into engagement with piston member 77 if said piston member 87 is not already in engagement with piston member 77. This will be apparent from the description of operation of the pistons and piston members in moving to their other positions, which will be hereinafter described.

When the piston members 77 and 87 and pistons 98 and 40 reach position No. 4 described above, the piston 40 and piston rod 2 will have been moved in the direction of the left-hand from the position in which they are shown in Fig. 1, a distance equal to the distance from the left-hand end of piston member 77 to the stop surface 86 shown in Fig. 1 plus the distance from the left-hand of piston 98 to the right-hand end of retaining member 105 when the piston 98 occupies the position shown in Fig. 1. In other words the distance that piston 40 and piston rod 2 are moved in the direction of the left-hand, from the position in which they are shown in Fig. 1, when handle 14 is moved to position No. 4, is equal to the sum of the distances they are moved when the handle 14 is moved to positions No. 2 and 3.

To continue the movement of piston 40 in the direction of the left-hand, the operator will turn the handle 14 from position No. 4 to position No. 5.

As will be seen in Fig. 2, with the handle 14 in position No. 5, a cavity 119 in the rotary valve 8 connects the pipes and passages 24, 25, 26, 27, 28, 30 and 31 to the exhaust port 32 thus venting the chambers 108, 68, 59, 52, 83, 104, and 107, respectively, while a port 120 in said rotary valve is effective to supply fluid at main reservoir pressure from the chamber 5 to pipes 23 and 29 and thence to the left-hand face of piston 40 and the right-hand face of piston member 87.

Since the area of piston member 87 thus subjected to pressure of fluid in chamber 93 is greater than the area of the opposite face of piston 40, a differential in forces will thereby be established, which will move piston member 87 into contact with piston 98 and then move pistons 98 and 40 in the direction of the left-hand until piston member 87 engages the stop surface 97.

During movement of the piston member 87 and pistons 98 and 40 in the direction of the left-hand, as just described, the left-hand face of piston 40 being subjected to fluid under pressure in chamber 71 urges piston 40 against the stem 99 to prevent overtravel of piston 40 when moved by piston member 87 and piston 98 from position No. 4 to position No. 5.

With the pistons of the fluid motor 1 in the position shown in Fig. 1, the distance from the left-hand end of piston member 87 to the stop surface 97 is greater than the distance from the left-hand end of piston member 77 to the stop surface 86 plus the distance from the left-hand face of piston 98 to the retaining member 105. Therefore, when the piston member 87 engages the stop surface 97, and the piston 98 engages the piston member 87 at the right-hand end of counterbore 88, the piston 40 will occupy a position to the left of the position it occupied when the handle 14 was in position No. 4.

To continue the movement of piston 40 in the direction of the left-hand, the operator will turn the handle 14 from position No. 5 to position No. 6.

As will be seen in Fig. 2, with the handle 14 in position No. 6, a cavity 121 in the rotary valve 8 connects the pipes and passages 24, 25, 26, 27, 28 and 31 to the exhaust port 32 thus venting the chambers 108, 68, 59, 52, 83 and 107, respectively, while a port 122 in said rotary valve is effective to supply fluid at main reservoir pressure from the chamber 5 to pipes 23, 29 and 30, thence to the left-hand face of piston 40, the right-hand face of piston member 87, and the right-hand face of piston 98.

The fluid under pressure supplied to chamber 93 through pipe 29 is effective to maintain piston member 87 in engagement with the stop surface 97.

As has been hereinbefore explained, the fluid under pressure supplied to the right-hand face of piston 98 and left-hand face of piston 40 establishes a differential in opposing forces on said pistons which will move the two pistons toward the left-hand to a position defined by contact of piston 98 with retaining member 105. Overtravel of piston 40 is prevented by fluid pressure acting on the left-hand face thereof as has been hereinbefore explained.

When the piston member 87 and pistons 98 and 40 reach position No. 6 described above, the piston 40 and piston rod 2 will have been moved in the direction of the left-hand from the position in which they are shown in Fig. 1, a distance equal to the distance from the left-hand end of piston member 87 to the stop surface 97 plus the distance fom the left-hand end of piston 98 to the right-hand end of retaining member 105 when the piston 98 occupies the position shown in Fig. 1. In other words, the distance that piston 40 and piston rod 2 are moved in the direction of the left-hand from the position in which they are shown in Fig. 1, when handle 14 is moved to position No. 6, is equal to the sum of the distances they are moved when the handle 14 is moved to positions Nos. 2 and 5.

To continue the movement of piston 40 in the direction of the left-hand, the operator will turn the handle 14 from position No. 6 to position No. 7.

As will be seen in Fig. 2, with the handle 14 in position No. 7, a cavity 123 in the rotary valve 8 connects the pipes and passages 23, 27, 28, 29 and 30 to the exhaust port 32 thus venting the chambers 71, 52, 83, 93 and 104, respectively, while a port 124 in said rotary valve is effective to supply fluid at main reservoir pressure from the chamber 5 to pipes 24, 25, 26 and 31 and thence to the right and left hand faces of piston 64, left-hand face of piston member 56, and right-hand face of piston 40.

The fluid under pressure thus effective on the left-hand face of piston member 56 will move said piston member in the direction of the right-hand until said piston member engages the stop surface 63, said member carrying with it the piston 64. At the same time as fluid under pressure is flowing to chamber 59 through pipe 26, fluid under pressure is also flowing to chamber 68 through pipe 25 and to chamber 108 through pipe 24.

The effective area of the right-hand face of piston 64 is less than the area of the left-hand face by an amount equal to the area of stem 65. Therefore, the fluid under pressure acting on the opposite faces of piston 64 is effective to establish a differential in opposing forces on said piston which will move said piston relative to the piston member 56 toward the right-hand to a position defined by contact of piston 64 with retaining member 69.

When the right-hand end of piston member 56 engages the stop surface 63 and the right-hand face of piston 64 engages the retaining member 69, the right-hand end of stem 65 will have been moved in the direction of the right-hand from the position in which it is shown in Fig. 1 a distance equal to the distance from the right-hand end of piston member 56 to the stop surface 63 plus the distance from the right-hand face of piston 64 to the retaining member 69 when said piston member and piston occupy the position in which they are shown in Fig. 1.

When the piston member 56, the piston 64, and stem 65 are moved to the above described position, the end of stem 65 will be disposed in a position to the left of the position, the piston 40 occupied when the handle 14 was in position No. 6.

The fluid under pressure supplied to chamber 107 through the pipe 31 is effective to move the piston 40 in the direction of the left-hand until the left-hand face of said piston engages the end of stem 65, the piston members 77 and 87 and piston 98 moving back to the position in which they are shown in Fig. 1 due to pressure of fluid in chamber 107.

Since fluid under pressure acting on the right-hand face of piston 40 must move said piston and piston rod 2 in the direction of the left-hand against the load on said rod while the piston member 56 and piston 64 move against no load, except friction, the piston member 56 and piston 64 will move to their above described positions prior to movement of the piston 40 to the position in which it engages the end of stem 65. Therefore, overtravel of piston 40 is prevented.

When the piston 40 engages the end of stem 64, said piston will occupy a position No. 7 which is to the left of the position it occupied when the handle 14 was in position No. 6.

It will be noted that it is not necessary to supply fluid under pressure to pipe 24 when handle 14 is turned to position No. 7 from position No. 6 since fluid under pressure supplied to chamber 108 at this time only acts in opposition to fluid under pressure supplied to chambers 68 and 59. It is necessary, however, to supply fluid under pressure to chamber 108 when handle 14 is turned from position No. 11 back to position No. 7 to effect movement of piston 40 and piston rod 2 in the direction of the right-hand from the position they occupy when the handle 14 is in position No. 11. This will be more clearly understood from the hereinafter given description of position No. 11.

To continue the movement of piston 40 in the direction of the left-hand, the operator will turn the handle 14 from position No. 7 to position No. 8.

As will be seen in Fig. 2, with the handle 14 in position No. 8, a cavity 125 in the rotary valve 8 connects the pipes and passages 23, 26, 28, 29 and 30 to the exhaust port 32 thus venting the chambers 71, 59, 83, 93 and 104, respectively, while a port 126 in said rotary valve is effective to supply fluid at main reservoir pressure from the chamber 5 to pipes 24, 25, 27 and 31, thence to the left and right hand faces of piston 64, left and right hand faces of piston member 49, and right-hand face of piston 40.

Since the area of the left-hand face of piston member 49 thus subjected to pressure of fluid in chamber 52 is greater than the area of the opposite face by an amount equal to the area of stem 65, a differential in opposing forces is thereby established on said piston which will move same toward the right-hand to a position defined by contact with stop surface 55.

Since fluid under pressure is supplied to chamber 68 through pipe 25 in position No. 8, as in position No. 7, said fluid under pressure will maintain the right-hand face of piston 64 in contact with retaining member 69.

When handle 14 is moved to position No. 8, the chamber 59, which was charged with fluid under pressure when handle 14 was in position No. 7, is vented to atmosphere through pipe 26 at the same time as fluid under pressure is supplied to chamber 108 through pipe 24. Therefore, as the pressure in chamber 59 is reduced, the fluid under pressure in chamber 108 moves piston member 56 and piston 64 in the direction of the left-hand until said piston member engages the piston member 49 at the left-hand end of counterbore 50.

When the right-hand end of piston member 49 engages the stop surface 55, the left-hand end of piston member 56 engages the piston member 49 at the left-hand end of counterbore 50, and the right-hand face of piston 64 engages the retaining member 69, the right-hand end of stem 65, the piston 40 and the piston rod 2 will have been moved, in the direction of the left-hand from the position they occupied when handle 14 was in position No. 7, a distance equal to the depth of counterbore 44, or, in other words, a distance equal to the distance from the right-hand end of piston member 56 to the stop surface 63 minus the distance from the right-hand end of piston member 49 to the stop surface 55 when said piston members occupy the position in which they are shown in Fig. 1.

The fluid under pressure supplied to chamber 107 through the pipe 31 is effective to move the piston 40 in the direction of the left-hand as the stem 65 moves in the direction of the left-hand in the manner explained above. Therefore, piston 40 maintains contact with the right-hand end of stem 64 in moving from position No. 7 to position No. 8 and overtravel of piston 40 is prevented as in the preceding positions.

To continue the movement of piston 40 in the direction of the left-hand, the operator will turn the handle 14 from position No. 8 to position No. 9.

As will be seen in Fig. 2, with the handle 14 in position No. 9, a cavity 127 in the rotary valve 8 connects the pipes and passages 23, 26, 27, 28, 29 and 30 to the exhaust port 32 thus venting the chambers 71, 59, 52, 83, 93 and 104, respectively, while a port 128 in said rotary valve is effective to supply fluid at main reservoir pressure from the chamber 5 to pipes 24, 25 and 31 thence to the left and right-hand faces of piston 64, and the right-hand face of piston 40.

Since fluid under pressure is supplied to chamber 68 through pipe 25 in position No. 9 as in positions No. 7 and 8, said fluid under pressure will maintain the right-hand face of piston 64 in contact with retaining member 69.

When handle 14 is moved to position No. 9, the chamber 52, which was charged with fluid under pressure with handle 14 in position No. 8, is vented to atmosphere at the same time as fluid under pressure is supplied to chamber 108 through pipe 24. Therefore, as the pressure in chamber 52 is reduced, the fluid under pressure in chamber 108 moves piston members 56 and 49 and piston 64 in the direction of the left-hand until piston member 49 engages the end of casing section 35 at the left-hand end of counterbore 48, the right-hand face of piston 64 remaining in contact with the retaining member 69.

When the left-hand end of piston member 49 engages the end of casing section 35 at the left-hand end of counterbore 48, with piston member 56 in engagement with said piston member 49 at the left-hand end of counterbore 50, and piston 64 in engagement with retaining member 69, the right-hand end of stem 65 will have been moved in the direction of the left-hand from the position it occupied when handle 14 was in position No. 8, a distance equal to the distance from the right-hand end of piston member 49 to the stop surface 55 when said piston member occupies the position in which it is shown in Fig. 1.

The fluid under pressure supplied to chamber 107 through the pipe 31 is effective to move the piston 40 in the direction of the left-hand as the stem 65 moves in the direction of the left-hand in the manner explained above. Therefore, piston 40 maintains contact with the right-hand end of stem 64 in moving from position No. 8 to position No. 9 and overtravel of piston 40 is prevented as in the preceding positions.

To continue the movement of piston 40 in the direction of the left-hand, the operator will turn the handle 14 from position No. 9 to position No. 10.

As will be seen in Fig. 2, with the handle 14 in position No. 10, a cavity 129 in the rotary valve 18 connects the pipes and passages 23, 24, 25, 27, 28, 29 and 30 to the exhaust port 32 thus venting the chambers 71, 108, 68, 52, 83, 93 and 104, respectively, while a port 130 in said rotary valve is effective to supply fluid at main reservoir pressure from the chamber 5 to pipes 26 and 31, thence to the left-hand end of piston member 56 and the right-hand face of piston 40.

When handle 14 is moved to position No. 10, the chamber 68, which was charged with fluid under pressure when handle 14 was in position No. 9, is vented to atmosphere through pipe 25 at the same time as fluid under pressure is supplied to chamber 59 through pipe 26. Therefore, fluid under pressure acting on the left-hand face of piston member 56 in chamber 59, and fluid under pressure acting on the right-hand face of piston 40 simultaneously moves the piston member 56 in the direction of the right-hand and the pistons 64 and 40 in the direction of the left-hand until the piston member 56 engages the stop surface 63 and the left-hand face of piston 64 engages the piston member 56 at the left-hand end of counterbore 57 in the piston member 56.

When the right-hand end of piston member 56 engages the stop surface 63 and the left-hand face of piston 64 engages the piston member 56 at the left-hand end of counterbore 57, the right-hand end of stem 65, the piston 40, and piston rod 2 will have been moved, in the direction of the left-hand from the position they occupied when handle 14 was in position No. 9, a distance equal to the distance from the right-hand face of piston 64 to the retaining member 69 minus the distance from the right-hand end of piston member 56 to the stop surface 63 when said piston member and piston occupy the position in which they are shown in Fig. 1.

To continue the movement of piston 40 in the direction of the left-hand, the operator will turn the handle 14 from postion No. 10 to position No. 11.

As will be seen in Fig. 2, with the handle 14 in position No. 11, a cavity 131 in the rotary valve 8 connects the pipes and passages 23, 24, 25, 26, 28, 29 and 30 to the exhaust port 32 thus venting the chambers 71, 108, 68, 59, 83, 93 and 104, respectively, while a port 132 in said rotary valve is effective to supply fluid at main reservoir pressure from the chamber 5 to pipes 27 and 31 thence to the left-hand face of piston member 49, and the right-hand face of piston 40.

With the chamber 59 connected to atmosphere, and fluid under pressure supplied to the left-hand face of piston member 49 and the right-hand face of piston 40, as explained in the preceding paragraph, said fluid under pressure will simultaneously move piston member 49 in the direction of the right-hand until said piston member 49 engages stop surface 55 and piston member 56, and pistons 64 and 40 in the direction of the left-hand until said piston member 56 engages the piston member 49 at the left-hand end of counterbore 50 in said piston member 49.

When the right-hand end of piston member 49 engages the stop surface 55 and the left-hand end of piston member 56 engages the piston member 49 at the left-hand end of counterbore 50, with piston 64 in engagement with piston member 56 and the left-hand face of piston 40 in engagement with the right-hand end of stem 65, said piston 40 and piston rod 2 will have been moved, in the direction of the left-hand from the position they occupied when handle 14 was in position No. 10, a distance equal to the depth of counterbore 44, or in other words, a distance equal to the distance from the right-hand end of piston member 56 to the stop surface 63 minus the distance from the right-hand end of piston member 49 to the stop surface 55 when said piston members occupy the position in which they are shown in Fig. 1.

To continue the movement of piston 40 in the direction of the left-hand, the operator will turn the handle 14 from position No. 11 to position No. 12.

As will be seen in Fig. 2, with the handle 14 in position No. 12, a cavity 133 in the rotary valve 8 connects the pipes and passages 23, 24, 25, 26, 27, 28, 29 and 30 to the exhaust port 32 thus venting the chambers 71, 108, 68, 59, 52, 83, 93, and 104, respectively, while a port 134 in said rotary valve is effective to supply fluid at main reservoir pressure from the chamber 5 to pipe 31 thence to the right-hand face of piston 40.

When handle 14 is moved to position No. 12, the chamber 52, which was charged with fluid under pressure when handle 14 was in position No. 11, is vented to atmosphere through pipe 27 at the same time as fluid under pressure is supplied to the right-hand face of piston 40. Therefore, the fluid under pressure acting on the right-hand face of piston 40 will move said piston, piston rod 2, piston 64, and piston members 56 and 49 in the direction of the left-hand until the piston member 49 engages the casing section 35 at the left-hand end of counterbore 48 in which position piston 64 and piston members 49 and 56 are shown in Fig. 1.

When the left-hand end of piston member 56 engages the casing section 35 at the left-hand end of counterbore 48, the right-hand end of stem 65, the piston 40 and piston rod 2 will have been moved, in the direction of the left-hand, from the position they occupied when handle 14 was in position No. 11 a distance equal to the distance from the right-hand end of piston member 49 to the stop surface 55 when said piston member 49 occupies the position in which it is shown in Fig. 1.

When handle 14 is turned to position No. 12, the piston 40 and piston rod 2 will be moved by pressure of fluid in chamber 107 to their extreme left-hand positions in which the piston members 49 and 56 and piston 64 occupy the position in which they are shown in Fig. 1 and the piston 40 is moved into engagement with the right-hand end of stem 65.

With handle 14 in position No. 12, the operator may turn said handle to position No. 13 to vent all fluid under pressure from the motor 1, or, as will now be apparent, he may turn the handle 14 successively back through the previous eleven positions to move the piston 40 and piston rod 2 in steps back to the position in which they are shown in Fig. 1, or he may turn the handle 14 from any one of its positions to any other of said positions and the piston 40 and piston rod 2 will be moved to the corresponding position.

*Summary*

It will now be seen that I have provided a fluid motor for positively moving a device to any selected one of a multiple of different definite positions without the possibility of said device being moved beyond the desired position.

Having now described my invention, what I claim as new and desire to secure by Letters Patent, is:

1. A fluid motor comprising a casing having three bores, a double acting power piston slidably mounted in one of said bores, three telescopically arranged piston members mounted in each of the other bores, three stops for each three telescopic piston members two of said stops on said casing for limiting movement of the respective outer and intermediate piston members and the third of said stops on said intermediate piston member for limiting movement of the respective inner piston member relative to said intermediate piston member, said piston members cooperating with said stops to provide at least twelve definite positions of said power piston.

2. A fluid motor comprising three coaxially arranged casing sections each having a bore, a double acting power piston slidably mounted in the bore of the center casing sections, three telescopically arranged piston members slidably mounted in each of the end casing sections, three chambers for each three telescopically arranged piston members the first of said chambers formed between one of said end casing sections and the outer telescopic piston member, the second of said chambers formed between said outer telescopic piston member and the intermediate telescopic piston member, and the third of said chambers formed between said intermediate telescopic piston member and the inner telescopic piston member, three stops for each three telescopic piston members two of said stops being carried by said center casing section for limiting movement of said outer and intermediate piston members and the third of said stops carried by said intermediate piston member for limiting movement of said inner piston member, and a fluid pressure communication between each of said chambers and the exterior of said casing for conveying fluid under pressure to said chambers to move the respective piston member into engagement with its respective stop to limit movement of said power piston.

3. In combination, a fluid motor comprising three coaxially arranged casing sections, each having a bore, a double acting power piston slidably mounted in the bore in the center casing section, two piston stop means each comprising three telescopically arranged piston members each having a diameter greater than the diameter of said power piston, one of said piston stop means slidably mounted in each of the other casing sections, a first fluid pressure communication extending from each of the inner piston members through the adjacent intermediate and outer piston members to the exterior of the respective casing section, a second fluid pressure communication extending from each of the intermediate piston members through the adjacent outer piston member to the exterior of the respective casing section, a third fluid pressure communication extending from each of the outer piston members to the exterior of the respective casing section, a stop member carried by the center casing section for each of the intermediate and outer piston members for limiting movement thereof in the direction of said power piston and another stop member carried by each of the intermediate piston members for limiting movement of each of the adjacent inner piston members relative thereto, a manually operative control valve device operative to a plurality of positions to, in each position, supply fluid under pressure to one face and to release fluid under pressure from the opposite face of certain of said piston members to position one or more of said piston members in a plurality of positions to limit movement of said power piston to different positions, a pipe connecting each of said fluid pressure communications to said control valve device for conveying fluid under pressure from said control valve device to the faces of said piston members to effect movement thereof into engagement with said stops, and two pipes for conveying fluid under pressure from said control valve to the respective faces of said power piston to effect movement thereof into engagement with one of said piston members.

WALLACE F. POORE.

REFERENCES CITED

The following references are of record in the file of this patent:

UNITED STATES PATENTS

| Number | Name | Date |
|---|---|---|
| 1,806,669 | Campbell | May 26, 1931 |
| 2,234,009 | Robinson | Mar. 4, 1941 |
| 2,510,314 | Jirsa | June 6, 1950 |
| 2,524,488 | Stevens | Oct. 3, 1950 |

FOREIGN PATENTS

| Number | Country | Date |
|---|---|---|
| 73,412 | Switzerland | Oct. 2, 1916 |
| 144,717 | Austria | Feb. 25, 1936 |